Patented Sept. 29, 1936

2,055,720

UNITED STATES PATENT OFFICE 2,055,720

HYDRATION OF OLEFINES

Alfred W. Francis, Woodbury, N. J., assignor to Socony-Vacuum Oil Company, Incorporated, New York, N. Y., a corporation of New York No Drawing. Application October 11, 1933, Serial No. 693,151

3 Claims. (Cl. 260—151.)

REISSUED
JAN 9 - 1940

This invention relates to the manufacture of isopropanol and diisopropyl ether from propylene.

The purpose of the invention is the economic conversion of propylene, through direct hydration, into isopropanol and diisopropyl ether by a simple process in which no material other than propylene and water is consumed.

If propylene be treated either alone, or in combination with inert gases such as propane, by contact, under elevated temperature and pressure, with sulphuric acid of about 20% to 65% concentration, the propylene may be converted directly and rapidly into isopropanol and diisopropyl ether, and the relative quantities of these products may be controlled by the molal ratio between the propylene and the water present.

The efficiency of the process is a function of acid concentration and temperature, but these quantities, at their permissible maxima, vary inversely, the limits being those which cannot be exceeded without undesirable side reactions. Owing to this inverse variation, the process may be carried out efficiently with acid varying in concentration through a range from about 20% to 65% at the appropriate corresponding temperatures, provided a pressure be used such as to give a sufficient density to the propylene at the reaction temperature. Since the lower acid concentrations call for higher temperatures and pressures to secure efficient results, I prefer to work nearer the upper limit of concentration. With acid of 60% concentration 100 degrees C. is a suitable temperature, which can be conveniently maintained by the use of steam, and a corresponding initial pressure of about 600 lbs. or more is sufficient.

Since the reagents and the products of the process are present in a vapor phase and one or two liquid phases, it is necessary, for practical efficiency, to agitate the contents of the reaction vessel constantly in such a manner as to maintain an intimate dispersion or foam in which there is extended contact between the vaporous and the liquid constituents.

The isopropanol which is the immediate result of the hydration is a solvent of propylene, so that as it accumulates it increasingly assists in maintaining adequate concentration of the propylene and intimate contact with the acid catalyst. For this reason, the pressure necessary for efficient operation is only initially dependent upon the vapor density of the propylene. When the process is conducted hermetically in an autoclave, the consumption of a part of the propylene, and the solution of a part of the remainder in the isopropanol, result in a substantial fall of pressure, but if the reagents, when introduced in the proper molal ratio and quantity, produce an initial pressure nearly equal to the vapor pressure of propylene at the reaction temperature, or to its extrapolated pressure in case the reaction temperature is above the critical temperature, the reaction may be carried out nearly to equilibrium with a continuing high efficiency. When the production of the desired end products has reached about 90% of the theoretical quantity for equilibrium, however, the rate of production falls off so rapidly that it is economical to interrupt the operation at that point.

Where the process is carried out in a continuous manner, the pressure may be maintained constant with some increase in efficiency.

The result of the reaction, when carried to or near to equilibrium, is always the production of both isopropanol and diisopropyl ether, but the ratio in which they occur may be controlled by using propylene and water in different molal ratios. When the alcohol is desired the ratio of propylene to water should be not over 1:1, the preferred ration being 0.8:1. When the ether is desired the ratio may be between 2:1 and 5:1, the preferred ratio being 2.5:1. If intermediate molal ratios are used, considerable quantities of both alcohol and ether will result.

It is not necessary that the propylene be pure, but it is desirable that it be separated from other olefines which may be polymerized or hydrated under the conditions of the reaction. Where the propylene is derived from the gases produced in the cracking of petroleum, it is feasible, by fractional distillation, to separate the propylene in a fraction which contains, in addition, only saturated hydrocarbons which do not interfere with the process. In the process as hereinafter specifically described the raw material is a mixture of propylene and propane such as may be secured by such fractionation, the propane being inert under the operating conditions.

In working for alcohol, after the interruption of the reaction the alcohol is preferably distilled off from the dilute acid as a constant-boiling mixture of alcohol and water. Since this results in concentration of the acid, it is necessary to add, before or during the distillation, enough water to prevent concentration of the acid beyond about 60%. Preferably, the distillation is preceded by the addition of an amount of water equal to the sum of that consumed in the reaction and that removed with the alcohol, so that upon completion of the distillation the acid has its original concentration and is ready for use again in the same process. The acid suffers no substantial loss or contamination, so that it may be re-used indefinitely.

When working for ether, the liquids separate into two layers, the upper layer containing substantially all the ether and the lower layer containing the dilute acid and such alcohol as has been produced. In this case it is desirable to leave the alcohol in the acid solution and merely dilute with the necessary water to restore the acid to the proper concentration for use, since the alcohol so retained acts usefully as a solvent for the propylene and also promotes the attainment of the equilibrium from which the ether results.

In working for alcohol also it is feasible to leave some alcohol in the acid solution when prepared for re-use, and such alcohol, serving from the outset as a solvent for the propylene, reduces the maximum or initial pressure necessary for a given rate of reaction. On the other hand, however, the alcohol so retained constitutes part of the equilibrium proportion, and thus reduces the quantity of alcohol which may be produced at each operation.

The useful solvent function performed by the isopropanol may be supplemented by the use of some auxiliary solvent. Such auxiliary solvent has the advantage that it reduces the pressure, or the degree of agitation, necessary to secure a given rate of reaction, while it does not affect the equilibrium of the reagents and products, if it be a material which is inert under the conditions of the reaction. Various inert solvents which are immiscible with the dilute acid may be used, including hydrocarbons and halogenated hydrocarbons. Chloroform, when used as a solvent, has the advantage that, when containing the dissolved propylene, its specific gravity is nearly the same as that of the dilute acid, so that the two liquids may easily be maintained in an emulsion.

Water-soluble solvents, such as aliphatic alcohols, may also be used, but as these react to some extent, the products of the reaction will contain compounds other than isopropanol and diisopropyl ether.

While the stated limits of 20% to 65% acid concentration are not absolute, I have found that the efficiency of the process falls off rapidly as the concentration is reduced below about 20%. When a concentration greater than about 60% is used it is necessary, after distilling off the alcohol, to reconcentrate the acid before it can be used again.

No absolute relation between acid strength and temperature can be fixed, since increase in temperature for a given strength results both in accelerated rate of reaction and in increased tendency to undesirable reactions, so that the advantage and the disadvantage must be weighed against each other economically. The temperatures corresponding to various acid concentrations which I have found most desirable, however, are approximately as in the following table:

| % $H_2SO_4$ | Degrees C. | Gauge pressure, lbs. |
|---|---|---|
| 20 | 150 | 1,340 |
| 30 | 140 | 1,225 |
| 40 | 130 | 1,110 |
| 50 | 120 | 1,000 |
| 60 | 100 | 760 |

It is inadvisable to exceed these temperatures by more than about 30 degrees.

In the same table pressures are shown which give the undissolved propylene, at the corresponding temperature, a density of about 0.23, which is approximately its density at the critical temperature. These pressures may be deemed those for optimum results, since the rate of reaction falls off substantially as they are reduced, while little is gained by exceeding them. For practical commercial results it is probably necessary to use at least 80% of the given pressure in each case.

It should be understood that the given pressures have reference particularly to the use of the process without any auxiliary solvent and during that part or phase prior to the accumulation of any substantial quantity of isopropanol. As before stated, the accumulation of this solvent material, an dthe use of an auxiliary solvent, have the effect of reducing the pressure at which economically practical results can be secured at any given temperature and acid concentration.

The following example illustrates an application of the process when working particularly for the production of isopropanol. A mixture consisting of 49.3 g. of propylene and 22.7 g. of propane was placed in an autoclave of 360 ml. capacity, together with 78 g. of aqueous sulphuric acid containing 60% acid by weight. The temperature was maintained at 100 degrees C., and the initial pressure was 680 lbs. gage. The contents of the autoclave were maintained, by strong agitation, in a thoroughly mixed condition for three hours, during which time the pressure fell to 475 lbs. The contents of the autoclave were then cooled and separated. 12.2 g. of propylene remained uncombined. The liquid products were diluted with 18 g. of water and distilled through a column, giving 45 g. of a distillate boiling at 80 degrees C. and containing 87%, or 39 g. of isopropanol, showing a conversion to isopropanol of 57% of the propylene charged. About 1 g. of diisopropyl ether was formed in addition.

The following example illustrates the process as operated with a view to the production of ether. A mixture of 61 g. of propylene and 38 g. of propane was placed in the same autoclave as before, together with 32 g. of aqueous sulphuric acid, of 60% concentration by weight, and the contents of the autoclave were maintained at 100 degrees C. and continuously agitated for 5.7 hours. The initial pressure was 800 lbs. gage, and the final pressure 370 lbs. At the end of the operation, 16.2 g. of propylene remained. 13 g. of water was added to the liquid products, which separated into two layers. The upper layer contained 38.2 g. of diisopropyl ether and 1.2 g. of water and isopropanol. The lower layer comprised acid of proper concentration for re-use in the same process. Upon analysis it was found to contain 13.5 g. of isopropanol which could either be left with the acid for re-use, or removed as a by-product. Of the propylene charged to the autoclave, 52% was converted to diisopropyl ether and 16% to isopropanol.

The acid concentration of 60% used in the foregoing examples is deemed the best upon all considerations. It is approximately the highest which can be attained in distilling off a constant-boiling mixture of isopropanol and water, and thus permits the lowest temperature and pressure which can be used without incurring the expense of further reconcentration of the acid, while the operating temperature of 100 degrees C. can be conveniently held constant.

In the foregoing examples the process was carried out in the absence of any solvent for propylene other than the isopropanol produced in the operation. Where isopropanol is included in the contents of the autoclave at the outset of the operation, either as a residue from a previous operation or as a reagent otherwise provided, the operation is not substantially changed in character, although the final equilibrium and the time, the pressure and the degree of agitation for efficient operation will necessarily be somewhat altered, the general tendency of such inclusion being to increase the relative amount of ether in the products.

The following example illustrates the use of an auxiliary solvent which is immiscible with water:

45 g. of 20% sulphuric acid, 76 g. of chloroform, 82.8 g. of propylene and 6.2 g. of propane were placed in the same autoclave as before, maintained at 150 degrees C. for 4.5 hours, and constantly agitated to maintain intimate contact. The initial pressure was 1070 lbs. gage, and the pressure fell to 590 lbs. during the operation. 20 g. of gaseous hydrocarbons remained, and the liquids separated into two layers. The aqueous layer, weighing only 15 g. was not analyzed, owing to its small content apart from the acid. The other layer, upon distillation, yielded 30 g. of isopropanol, 15.5 g. of diisopropyl ether and about 64 g. of chloroform.

In the foregoing example the pressures were substantially below the optimum for the acid concentration and temperature used, but an economically feasible rate of reaction was maintained by reason of the use of the auxiliary solvent.

In every application of my process the maintenance of extended surfaces of contact between the propylene and the dilute acid is essential for a commercially practical rate of operation, and agitation sufficient to maintain the contents of the apparatus in a foamy or finely divided and intimately mingled condition is therefore an essential feature of the process. In laboratory operation in a small autoclave such agitation may conveniently be produced by a magnetically operated stirrer vibrating vertically, while in commercial operation any known or suitable means for the purpose may be used.

I claim as my invention:

1. The process, for hydrating propylene, which consists in maintaining intimate contact of propylene with sulphuric acid of approximately 60% concentration by weight, at a temperature of approximately 100 degrees C. and under a pressure of not less than 300 lbs. gage, the molal ratio of propylene to water being not over 5 to 1.

2. The improvement, in the process of hydrating propylene by heating the same in the presence of dilute sulphuric acid and under elevated pressure, which resides in the addition, to the reaction mixture, of a solvent for propylene other than a product of the reaction, which is liquid under the conditions of temperature and pressure at which the reaction is conducted.

3. The improvement, in the process of hydrating propylene by heating the same in the presence of dilute sulphuric acid and under elevated pressure, which resides in the addition, to the reaction mixture, of chloroform as a solvent for the propylene.

ALFRED W. FRANCIS.